United States Patent
Miyazawa

(10) Patent No.: US 7,013,735 B2
(45) Date of Patent: Mar. 21, 2006

(54) PRESSURE SENSOR

(75) Inventor: Keiji Miyazawa, Tokyo (JP)

(73) Assignee: Yamatake Corporation, Tokyo (JP)

( * ) Notice: Subject to any disclaimer, the term of this patent is extended or adjusted under 35 U.S.C. 154(b) by 37 days.

(21) Appl. No.: 10/485,450

(22) PCT Filed: Jul. 31, 2002

(86) PCT No.: PCT/JP02/07806

§ 371 (c)(1),
(2), (4) Date: Jan. 28, 2004

(87) PCT Pub. No.: WO03/012386

PCT Pub. Date: Feb. 13, 2003

(65) Prior Publication Data

US 2004/0187588 A1    Sep. 30, 2004

(30) Foreign Application Priority Data

Aug. 1, 2001    (JP) .............................. 2001-233143

(51) Int. Cl.
*G01L 9/00* (2006.01)
(52) U.S. Cl. .......................................... 73/717; 338/4
(58) Field of Classification Search .................. 73/717, 73/718, 719, 720, 721, 861.65; 338/4, 442
See application file for complete search history.

(56) References Cited

U.S. PATENT DOCUMENTS

| | | | | |
|---|---|---|---|---|
| 4,347,745 A | * | 9/1982 | Singh | 73/721 |
| 5,029,479 A | * | 7/1991 | Bryan | 73/721 |
| 5,672,808 A | * | 9/1997 | Klauder et al. | 73/1.59 |
| 5,804,736 A | * | 9/1998 | Klauder et al. | 73/724 |
| 6,029,524 A | * | 2/2000 | Klauder et al. | 73/718 |

FOREIGN PATENT DOCUMENTS

| | | |
|---|---|---|
| JP | 63-008524 A | 1/1988 |
| JP | 03-067139 A | 3/1991 |
| JP | 07-058347 A | 3/1995 |
| JP | 08-334426 | 12/1996 |
| JP | 08-334426 A | 12/1996 |
| JP | 09-502809 A | 3/1997 |
| JP | 09-138173 | 5/1997 |
| JP | 09-138173 A | 5/1997 |
| JP | 10-197316 | 7/1998 |
| JP | 10-197316 A | 7/1998 |
| JP | 11-132881 A | 5/1999 |
| JP | 11-160176 A | 6/1999 |
| JP | 2000-121475 A | 4/2000 |

* cited by examiner

*Primary Examiner*—Edward Lefkowitz
*Assistant Examiner*—Andre Allen
(74) *Attorney, Agent, or Firm*—Blakely Sokoloff Taylor & Zafman

(57) ABSTRACT

A differential pressure sensor chip (4) comprises a diaphragm for measuring a differential pressure and converts a pressure received by the diaphragm for measuring the differential pressure into an electrical signal. A static pressure sensor chip (5) comprises a diaphragm for measuring a static pressure and converts a pressure received by the diaphragm for measuring the static pressure into an electrical signal. The differential pressure sensor chip (4) and static pressure sensor chip (5) are mounted on a header (1) so that one surface of the differential pressure sensor chip (4) and one surface of the static pressure sensor chip (5) are exposed to the interior of a common pressure introducing chamber (17).

5 Claims, 2 Drawing Sheets

PRESSURE SENSOR

The present application is a non-provisional application of International Application No. PCT/JP02/07806, filed Jul. 31, 2002.

BACKGROUND OF THE INVENTION

The present invention relates to a pressure sensor in which a differential pressure sensor chip for measuring a differential pressure and a static pressure sensor chip for measuring a static pressure are stored in one package.

Conventionally, as a method of measuring the flow rate of a fluid, a method is available with which a pressure difference between the upstream and downstream of a restrictor is measured by utilizing the fact that the pressure difference between the upstream and downstream of the restrictor provided to a flow channel is proportional to the flow velocity, and is converted into a flow rate. With a liquid level indicator, the pressure difference between the upper and lower portions of a tank is measured, and a liquid level with a liquid density being taken into consideration is measured from the pressure difference. For such differential pressure measurement, a differential pressure sensor is usually used. The differential pressure sensor is a sensor that receives two different to-be-measured pressures with sensor chips simultaneously and detects a differential pressure between the two pressures.

Sometimes a static pressure, i.e., a gauge pressure with reference to an atmospheric pressure, or an absolute pressure with reference to a vacuum state is measured simultaneously with the differential pressure described above, and monitoring and control are performed simultaneously. As the differential pressure sensor is a measurement unit that measures a pressure difference between two points, it cannot measure the static pressure itself.

A pressure sensor in which a differential pressure measuring sensor chip and a static pressure measuring sensor chip are combined is proposed as shown in Japanese Patent Laid-Open No. 63-008524 (reference 1). The pressure sensor disclosed in reference 1 is constituted by a sensor housing incorporating a differential pressure measuring sensor chip and static pressure measuring sensor chip, and a main body which is sealed with a pair of barrier diaphragms and into which a sealed liquid has been injected. The sensor housing and main body are fabricated separately, and are bonded and fixed to each other.

In the conventional pressure sensor described above, the interior of the main body is partitioned into at least two inner chambers to correspond to the pair of barrier diaphragms, and the sealed liquid is injected into the respective inner chambers. A high to-be-measured pressure applied to one barrier diaphragm and a low to-be-measured pressure applied to the other barrier diaphragm are transmitted to the differential pressure measuring sensor chip through the corresponding sealed liquid. Either one of the high and low to-be-measured pressures is transmitted to the static pressure measuring sensor chip through the corresponding sealed liquid. In this manner, as the conventional pressure sensor has a complicated structure, its package becomes undesirably large.

As the sensor housing and main body are fabricated separately, the distances between the barrier diaphragms and two sensor chips increase, and the distance between the two sensor chips accordingly increases. Therefore, in the conventional pressure sensor, the amount of sealed liquid increases, and accordingly the range of pressure that can be measured becomes narrow, so that the temperature characteristics are degraded.

To solve these problems, a differential pressure sensor and static pressure sensor may be integrally formed on one chip. To fabricate such a pressure sensor, one semiconductor substrate is etched to form a differential pressure measuring diaphragm and static pressure measuring diaphragm at different regions. Subsequently, strain gauges (in the case of piezoelectric pressure sensors) or electrodes (in the case of electrostatic capacitive pressure sensors) are formed on the two diaphragms.

When the differential pressure sensor and static pressure sensor are integrally formed on one chip, the manufacture becomes difficult and the cost increases. More specifically, the differential pressure sensor and static pressure sensor have different measurement ranges. For this reason, the static pressure measuring diaphragm must have a larger thickness and a smaller diameter than those of the differential pressure measuring diaphragm, so that it can withstand a large pressure.

When, however, the thickness of the diaphragm of the differential pressure sensor and that of the static pressure sensor are to be made different on one semiconductor substrate, the manufacturing process will become complicated. When the diameter of the diaphragm decreases, the step of forming a strain gauge or electrode on the diaphragm becomes difficult. When the two diaphragms have the same thickness and the diameter of the static pressure measuring diaphragm is increased, the manufacturing process can be facilitated. In this case, the sensitivity of the differential pressure sensor may decrease unless the diameter of the differential pressure measuring diaphragm is increased as well. When the diameter of the differential pressure measuring diaphragm is increased accordingly, the chip size increases, and the cost increases.

It is an object of the present invention to provide a pressure sensor that can obtain good temperature characteristics and a wide measurement pressure range.

It is another object of the present invention to provide a pressure sensor that can be manufactured easily and allows a package to be downsized.

SUMMARY OF THE INVENTION

A pressure sensor according to the present invention comprises a differential pressure sensor chip which has a differential pressure measuring diaphragm, converts a pressure received by the differential pressure measuring diaphragm into an electrical signal, and outputs the electrical signal, a static pressure sensor chip which has a static pressure measuring diaphragm, converts a pressure received by the static pressure measuring diaphragm into an electrical signal, and outputs the electrical signal, a base on which the differential pressure sensor chip and static pressure sensor chip are mounted, the base having a first pressure introducing channel for introducing a first pressure to a first surface of the differential pressure sensor chip, and a second pressure introducing channel for introducing a second pressure to a first surface of the static pressure sensor chip, and a pressure introducing chamber which is formed in the base to accommodate the differential pressure sensor chip and static pressure sensor chip, and serves to introduce a third pressure commonly to a second surface of the differential pressure sensor chip and a second surface of the static pressure sensor chip.

DETAILED DESCRIPTION OF THE PREFERRED EMBODIMENT

The present invention will be described in detail with reference to the drawings.

Figure 1A:
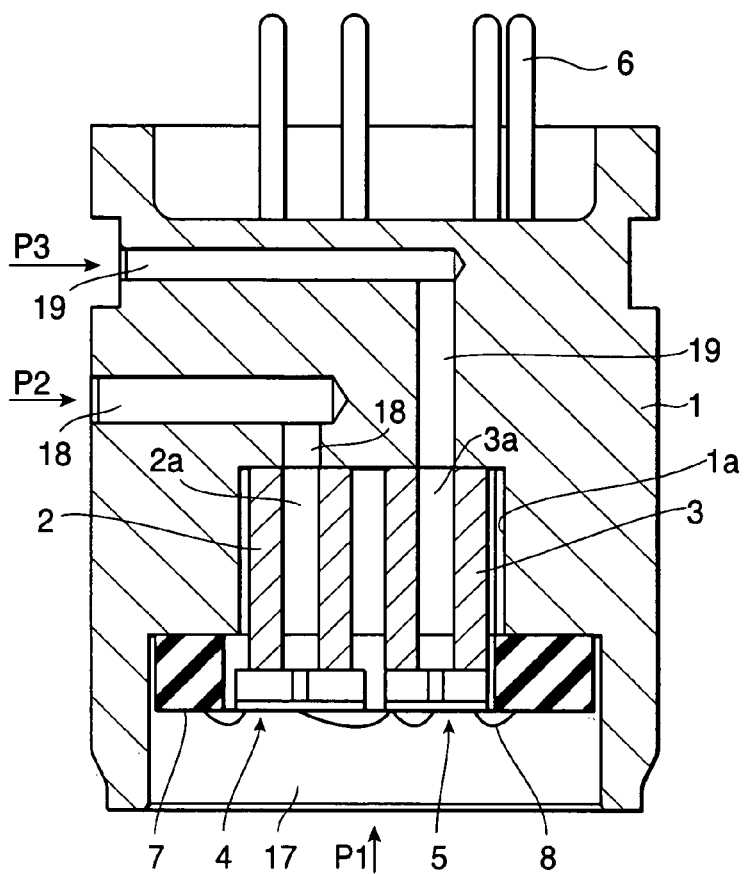
FIG. 1A is a sectional view of a pressure sensor according to one embodiment of the present invention.
Figure 1B:
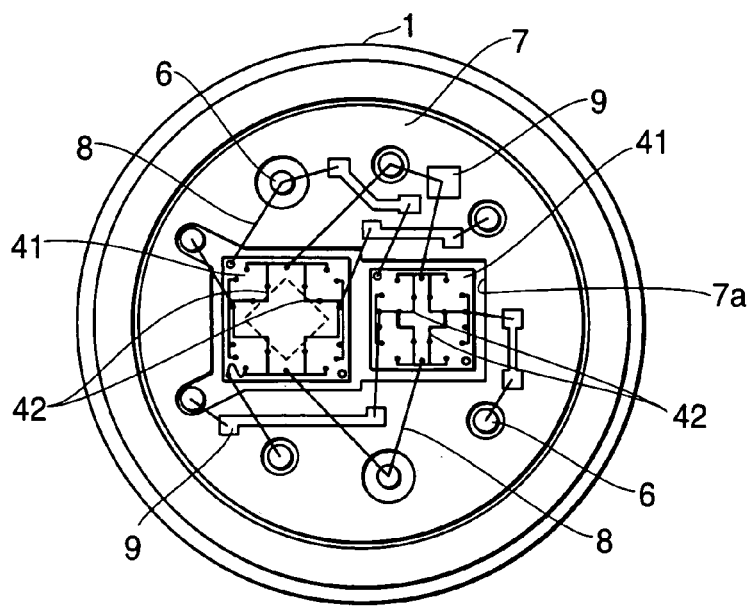
FIG. 1B is a bottom view of the pressure sensor shown in FIG. 1A.

FIGS. 1A and 1B show a pressure sensor according to an embodiment of the present invention. As shown in FIG. 1B, the pressure sensor of this embodiment has a columnar header 1 serving as a base having a stepped recess 1a, first and second prismatic first pedestals 2 and 3 bonded and fixed to the bottom surface of the recess 1a of the header 1 side by side, a differential pressure measuring differential pressure sensor chip 4 bonded and fixed on the first pedestal 2, a static pressure measuring static pressure sensor chip 5 bonded and fixed on the second pedestal 3, a plurality of sensor output pins 6 for guiding electrical signals from the sensor chips 4 and 5 to the outside, a circular disk-like ceramic board 7 with a surface where wiring patterns 9 (FIG. 1B) to electrically connect the sensor chips 4 and 5 to the sensor output pins 6 are formed, and a plurality of wires 8 for connecting the sensor chips 4 and 5 and the sensor output pins 6 to each other and the sensor chips 4 and 5 and the wiring patterns 9 to each other.

Figure 2:
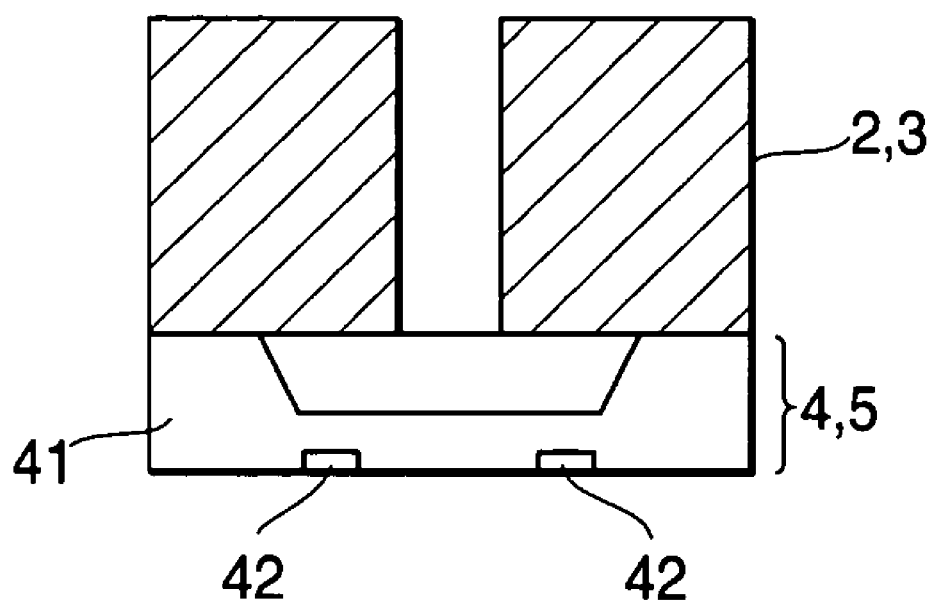
FIG. 2 is an enlarged sectional view of the sensor chip shown in FIGS. 1A and 1B.

The sensor chips 4 and 5 bonded and fixed on the pedestals 2 and 3 are respectively formed of known piezoelectric pressure sensor chips. As shown in FIG. 2, each of the piezoelectric pressure sensor chips 4 and 5 is constituted by a semiconductor diaphragm 41 and strain gauges 42 formed on the semiconductor diaphragm 41 and having a piezoelectric resistor effect. In this arrangement, the strain gauges 42 are deformed by the pressure applied to the diaphragm 41. Changes in resistance of the strain gauges 42 caused by the piezoelectric resistor effect are detected, so that the pressure is measured.

As the sensor chips 4 and 5, known electrostatic capacitive pressure sensors may be used in place of the piezoelectric pressure sensor chips. An electrostatic capacitive pressure sensor chip has a substrate with a predetermined space (capacitance chamber), a diaphragm arranged on the space of the substrate, a stationary electrode formed on the substrate, and a movable electrode formed on the diaphragm. In this arrangement, upon reception of a pressure, the diaphragm deforms, and the distance between the movable and stationary electrodes changes accordingly, so that the electrostatic capacitance between the movable and stationary electrodes changes. The pressure received by the diaphragm is measured on the basis of the change in electrostatic capacitance.

According to another type of electrostatic capacitive pressure sensor chip, a change in electrostatic capacitance is detected not from deformation of the diaphragm but from compression of the material that forms the capacitance chamber. According to still another type of pressure sensor chip, the pressure is measured by modulating the displacement of the diaphragm into an optical signal. When the differential pressure sensor chip 4 and the static pressure sensor chip 5 are compared, a smaller pressure is applied to the diaphragm of the differential pressure sensor chip 4. Thus, to improve the sensitivity, the differential pressure sensor chip 4 has a larger diaphragm diameter than that of the static pressure sensor chip 5.

The sensor chips 4 and 5 having the above structure are electrostatically bonded (anodic bonding) to the end faces of the pedestals 2 and 3, respectively. If thermal strain generated when bonding the sensor chips 4 and 5 is transmitted to the sensor chips 4 and 5, the temperature characteristics of the sensor chips 4 and 5 degrade to cause zero point shift. In view of this, the pedestals 2 and 3 are made of a material having a thermal expansion coefficient similar to that of the sensor chips 4 and 5, e.g., a ceramic material such as borosilicate glass (Corning 7740) or silicon nitride.

The header 1 is made of a material having good corrosion resistance and good weldability, e.g., stainless steel or Kovar. The pedestals 2 and 3, sensor chips 4 and 5, ceramic board 7, and the like are accommodated in the recess 1a formed at the center of the lower surface of the header 1. Those end faces (upper end faces) of the pedestals 2 and 3 which are opposite to the sensor chips 4 and 5 are bonded and fixed to the header 1 with a brazing material.

A through hole 7a through which the pedestals 2 and 3 are to extend is formed at the center of the ceramic board 7. The through hole 7a has a shape of two different-size, substantially square holes, when seen from above, that are continuous to each other. Insertion holes through which the sensor output pins 6 are to extend are formed in the peripheral portion of the ceramic board 7 to surround the through hole 7a. The wiring patterns 9 which electrically connect the sensor chips 4 and 5 and the sensor output pins 6 to each other are formed on the surface of the ceramic board 7 on the sensor chip side. The ceramic board 7 is bonded to the header 1 at its peripheral portion with a brazing material.

The terminals of the sensor chips 4 and 5 for the power supply, ground, and detectors (strain gauges in the case of piezoelectric pressure sensors, and electrodes in the case of electrostatic capacitive pressure sensors) and the wiring patterns 9 formed on the ceramic board 7, and the sensor chips 4 and 5 and the sensor output pins 6 are electrically connected to each other through the wires 8 made of Au or the like. The wiring patterns 9 and the sensor output pins 6 are also electrically connected to each other through the wires 8.

The sensor output pins 6 extending through the header 1 and connected to the outside of the pressure sensor are hermetically sealed with glass so that the header 1 and the sensor output pins 6 are electrically insulated from each other and that the sealed liquid is prevented from leaking.

A circular pressure introducing chamber 17 for introducing a to-be-measured pressure P1 commonly to the lower surfaces of the sensor chips 4 and 5 is formed in the lower opening side of the recess 1a of the header 1. Pressure introducing channels 18 and 19 with L-shaped sections for introducing to-be-measured pressures P2 and P3 on the outer surface of the header 1 to the bottom surface of the recess 1a are formed in the header 1 such that they open to the outer surface of the header 1 and the bottom surface of the recess 1a, respectively. The pedestal 2 has a hollow portion 2a which communicates with the pressure introducing channel 18 of the header 1 and introduces the to-be-measured pressure P2 from the pressure introducing channel 18 to the upper surface of the differential pressure sensor chip 4. The pedestal 3 has a hollow portion 3a which communicates with the pressure introducing channel 19 of the header 1 and introduces the to-be-measured pressure P3 from the pressure introducing channel 19 to the upper surface of the static pressure sensor chip 5.

As the to-be-measured pressures P1, P2, and P3, the pressure of a gas or liquid may be directly applied to the sensor chips 4 and 5. Usually, barrier diaphragms (not shown) which come into contact with a to-be-measured fluid are arranged at measurement positions formed by extending the pressure introducing chamber 17 and pressure introducing channels 18 and 19. A sealed liquid such as silicone oil is injected into the pressure introducing chamber 17 and pressure introducing channels 18 and 19 sealed by the respective barrier diaphragms. Thus, the to-be-measured pressures P1, P2, and P3 acting on the respective barrier diaphragms are transmitted to the sensor chips 4 and 5 through the sealed liquid.

The operation of the pressure sensor having the above arrangement will be described. First, the high to-be-measured pressure P1 is introduced to the lower surface of the differential pressure sensor chip 4, and the low to-be-measured pressure P2 is introduced to the upper surface of the differential pressure sensor chip 4. Thus, the differential pressure measuring diaphragm of the differential pressure sensor chip 4 displaces in accordance with the differential pressure (P1–P2). At this time, the output voltage from the differential pressure sensor chip 4 is extracted through the sensor output pin 6, so that the differential pressure (P1–P2) is measured.

The to-be-measured pressure P1 is introduced to the lower surface of the static pressure sensor chip 5, and the atmospheric pressure P3 is introduced to the upper surface of the static pressure sensor chip 5. Thus, the static pressure measuring diaphragm in the static pressure sensor chip 5 displaces in accordance with the differential pressure (P1–P). At this time, the output voltage from the static pressure sensor chip 5 is extracted through the sensor output pin 6, so that the differential pressure (P1–P3), i.e., the gauge pressure, is measured. Also, the interior of the pressure introducing channel 18 is set in a vacuum state, so that the to-be-measured pressure P1 with reference to the vacuum state, i.e., the absolute pressure, is measured.

In the pressure sensor according to this embodiment, since gaps are present between the pedestals 2 and 3 and the ceramic board 7 and between the pedestals 2 and 3, the sealed liquid enters the ceramic board 7 and recess 1a as well, thus forming the pressure introducing chamber 17. Usually, spacers are arranged in the gaps between the pedestals 2 and 3 and the ceramic board 7 and between the pedestals 2 and 3 so that the amount of sealed liquid may be decreased. The spacers are usually made of a ceramic material such as alumina so that any change in volume caused by temperature change may be prevented as much as possible.

As has been described above, according to the present invention, the differential pressure sensor chip and static pressure sensor chip are mounted on one base so that their faces are exposed to the interior of the common pressure introducing chamber. Thus, the differential pressure sensor chip and static pressure sensor chip can be arranged close to each other. The amount of sealed liquid can be decreased to be smaller than that in a conventional pressure sensor in which a housing for the differential pressure sensor chip, a housing for the static pressure sensor chip, and a main body are fabricated separately and bonded to each other. As a result, good temperature characteristics and a wide measurement pressure range can be obtained.

As the differential pressure sensor chip and static pressure sensor chip can be arranged close to each other, the structure of the pressure sensor is accordingly simplified, so that the package can be downsized. The manufacturing process for the pressure sensor can be simplified, and the manufacturing cost can be reduced. The differential pressure sensor chip and static pressure sensor chip are fabricated in separate manufacturing processes, and optimal diaphragms suited to their applications can be formed in the respective chips. When compared to a case wherein the differential pressure sensor and static pressure sensor are integrally formed on one chip, the manufacture becomes easier, and the cost can be reduced more.

What is claimed is:

1. A pressure sensor characterized by comprising:
    an independent differential pressure sensor chip which has a differential pressure measuring diaphragm, converts a pressure received by said differential pressure measuring diaphragm into an electrical signal, and outputs the electrical signal;
    an independent static pressure sensor chip which has a static pressure measuring diaphragm, converts a pressure received by said static pressure measuring diaphragm into an electrical signal, and outputs the electrical signal; and a base on which said differential pressure sensor chip and static pressure sensor chip are mounted,
    wherein said base has a first pressure introducing channel for introducing a first pressure to a first surface of said differential pressure sensor chip, a second pressure introducing channel for introducing a second pressure to a first surface of said static pressure sensor chip, a pressure introducing chamber for introducing a third pressure commonly to a second surface of said differential pressure sensor chip and a second surface of said static pressure sensor chip, said base is formed of a columnar header,
    said pressure introducing chamber is formed at a center of an end face of said header,
    said first and second pressure introducing channels are open to said pressure introducing chamber to introduce the first and second pressures into said pressure introducing chamber from an outside of said header,
    first and second cylindrical pedestals each having a hollow portion with one end face being bonded and fixed to said header to correspond to an opening of corresponding one of said first and second pressure introducing channels and with the other end face to which corresponding one of said differential pressure sensor chip and static pressure sensor chip is bonded and fixed,
    the first pressure is introduced to said first surface of said differential pressure sensor chip through said first pressure introducing channel and the hollow portion of said first pedestal,
    the second pressure is introduced to said first surface of said static pressure sensor chip through said second pressure introducing channel and the hollow portion of said second pedestal,
    the independent differential pressure sensor chip, the independent static pressure sensor chip, the first pedestal and the second pedestal each stored in a pressure introducing chamber, and a gap exists between the first pedestal and the second pedestal.

2. The pressure sensor according to claim 1, further comprising:
    an insulating substrate which is fixed to a bottom portion of said pressure introducing chamber and has a through hole through which said first and second pedestals extend so that said second surface of said differential pressure sensor chip on said first pedestal and said second surface of said static pressure sensor chip on said second pedestal are exposed to said pressure introducing chamber; and an electrical circuit formed on said insulating substrate and including a sensor output pin.

3. The pressure sensor according to claim 1, further comprising:

a barrier diaphragm that covers openings of said first and second pressure introducing channels and a pressure introducing port of said pressure introducing chamber; and a fluid sealed in said first and second pressure introducing channels and pressure introducing chamber.

4. The pressure sensor according to claim 1, wherein the second pressure is the atmospheric pressure, and the independent static pressure sensor chip measures a gage pressure (the third pressure−the second pressure) with reference to the atmospheric pressure.

5. A pressure sensor characterized by comprising:

an independent differential pressure sensor chip which has a differential pressure measuring diaphragm, converts a pressure received by said differential pressure measuring diaphragm into an electrical signal, and outputs the electrical signal;

an independent static pressure sensor chip which has a static pressure measuring diaphragm, converts a pressure received by said static pressure measuring diaphragm into an electrical signal, and outputs the electrical signal; and a base on which said differential pressure sensor chip and static pressure sensor chip are mounted, wherein said base has a first pressure introducing channel for introducing a first pressure to a first surface of said differential pressure sensor chip, a second pressure introducing channel for introducing a second pressure to a first surface of said static pressure sensor chip, a pressure introducing chamber for introducing a third pressure commonly to a second surface of said differential pressure sensor chip and a second surface of said static pressure sensor chip, said base is formed of a columnar header, said pressure introducing chamber is formed at a center of an end face of said header, said first and second pressure introducing channels are open to said pressure introducing chamber to introduce the first and second pressures into said pressure introducing chamber from an outside of said header, first and second cylindrical pedestals each having a hollow portion with one end face being bonded and fixed to said header to correspond to an opening of corresponding one of said first and second pressure introducing channels and with the other end face to which corresponding one of said differential pressure sensor chip and static pressure sensor chip is bonded and fixed, the first pressure is introduced to said first surface of said differential pressure sensor chip through said first pressure introducing channel and the hollow portion of said first pedestal, the second pressure is introduced to said first surface of said static pressure sensor chip through said second pressure introducing channel and the hollow portion of said second pedestal, the independent differential pressure sensor chip, the independent static pressure sensor chip, the first pedestal and the second pedestal each stored in a pressure introducing chamber, a gap exists between the first pedestal and the second pedestal, the second pressure is the atmospheric pressure, and the independent static pressure sensor chip measures a gage pressure (the third pressure−the second pressure) with reference to the atmospheric pressure.

* * * * *